T. T. WOODRUFF.
Improvement in Process and Apparatus for the Manufacture of Indigo.
No. 126,664. Patented May 14, 1872.
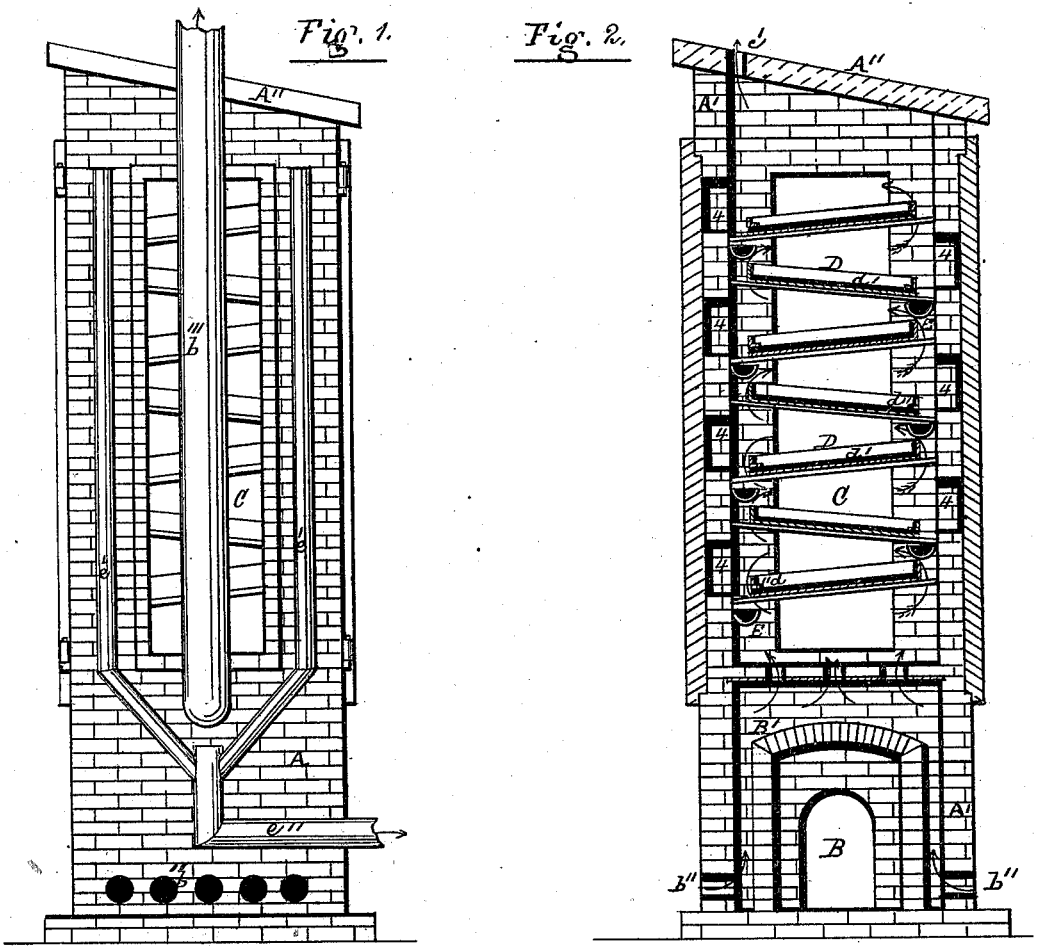
WITNESSES:
INVENTOR:

T. T. WOODRUFF.
Improvement in Process and Apparatus for the Manufacture of Indigo.
No. 126,664.  Patented May 14, 1872.
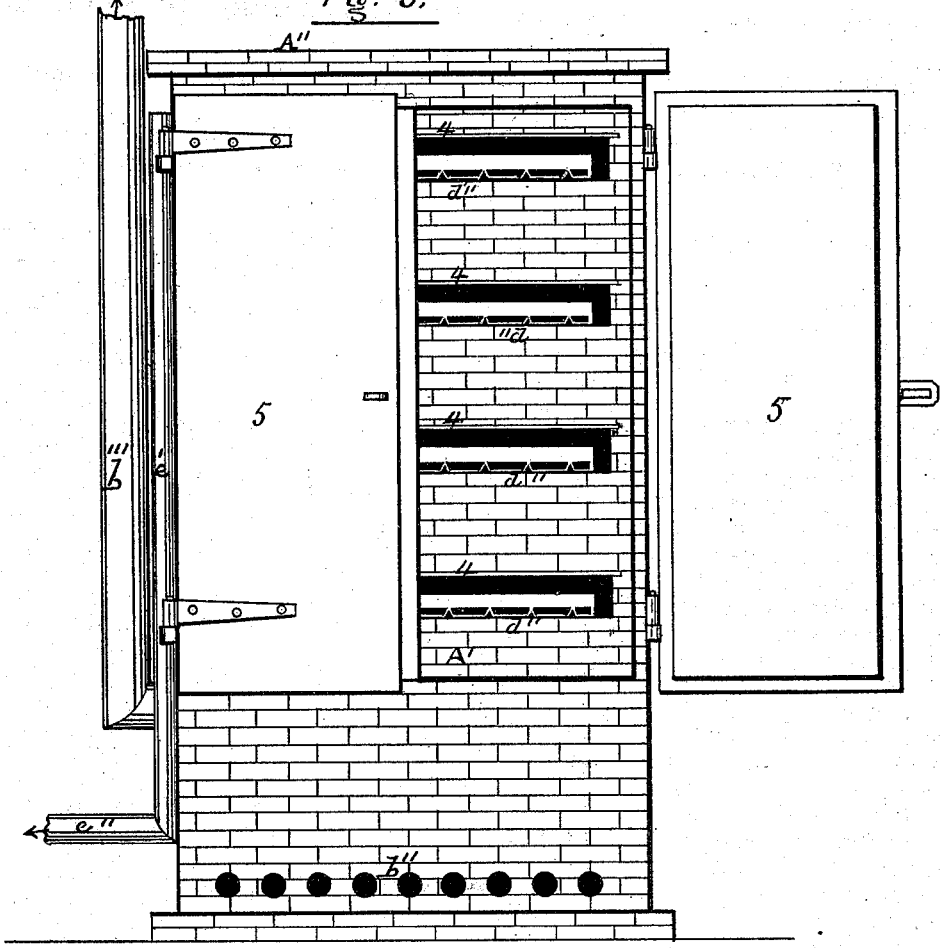
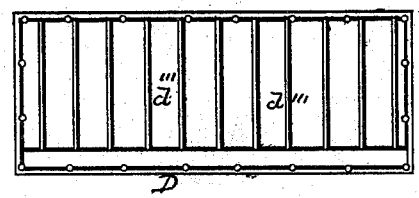
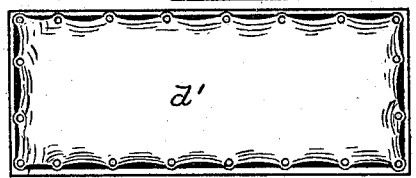
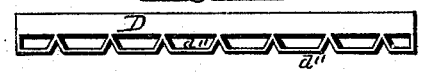
WITNESSES:  INVENTOR:

UNITED STATES PATENT OFFICE.

THEODORE T. WOODRUFF, OF PHILADELPHIA, PENNSYLVANIA, ASSIGNOR OF ONE-HALF OF HIS RIGHT TO EDWARD S. MORRIS, OF SAME PLACE.

IMPROVEMENT IN PROCESSES AND APPARATUS FOR THE MANUFACTURE OF INDIGO.

Specification forming part of Letters Patent No. 126,664, dated May 14, 1872.

Specification describing certain improvements in the process of draining and drying the magma or paste in the manufacture of indigo from the plant, and in the apparatus therefor, invented by THEODORE T. WOODRUFF, of the city of Philadelphia, in the State of Pennsylvania.

The first part of my present invention relates to the subjection of the magma deposited in the oxidizing-vat (see specification in division A) to the desiccating action of a strong current of air while the said magma is spread in thin layers upon draining-cloths, supported, respectively, in a series of trays in such a manner that the drain-water will be permitted to rapidly separate and pass off by gravitation, and the remaining moisture be rapidly evaporated and carried off, so as to leave the indigo on the cloths in a perfectly dry condition for subsequent condensation, (see specification in division C,) the object of this part of my invention being to deprive the magma of all moisture in such a speedy and perfect manner as to effectually prevent the generation or formation of the vegetable fungus or mold, with which the indigo of commerce is invariably impregnated, and, consequently, greatly impaired in value by reducing the quantity and injuring the quality. The second part of my invention relates to the construction of the apparatus whereby the said speedy draining and drying of the oxidized extract or magma of the indigo-plant is effected with facility.

Figure 1 is an end elevation of the draining and drying apparatus. Fig. 2 is a vertical transverse section of the same. Fig. 3 is a side elevation. Fig. 4 is a plan view of one of the series of trays without its draining-cloth; Fig. 5, a plan view of the same with its draining-cloth applied; and Fig. 6, a view of the open side of the trays.

The apparatus consists of vertical end and side walls A A′ and roof A‴, inclosing, at its lower part, a furnace, B, surrounded by an air-heating chamber, B′, which receives fresh air through openings $b''$ near the bottom of the external walls A A′, and discharges it in a continuous current into a drying-chamber, C, above, in which are placed, in oppositely-inclined positions, (see Figs. 1 and 2,) numerous changeable trays D D, each provided with a co-extensive draining-cloth, $d'$, and openings $d''$ (see Figs. 5 and 6) for straining out and discharging the drain-water into reception-troughs E, (see Fig. 2,) whereby the said water is conveyed to outside water-pipes $e'$ $e''$. (See Figs. 1 and 2.) Suitable openings 4 4 are made through the side walls A A′ for the introduction and withdrawal of the respective trays, the said side walls being also provided with doors 5 5, which give access to the openings for the introduction and withdrawal of the said trays, as occasion may from time to time require. The trays D D are shallow oblong pans, provided with numerous transverse ribs $d'''$ for supporting the draining-cloth $d'$ sufficiently above the bottom to allow the drain-water to pass freely between the said ribs and cloth to the openings $d''$ when the trays are each supported in the oppositely-inclined positions shown in Fig. 2. Along under the lower edge of each of the said trays D the drip-trough E is arranged and secured so as to convey the drip-water into the outside water-pipes $e'$ $e''$. The trays D are arranged and supported in the drying-chamber C, in separate positions, upon any suitable bars or ledges, so that the current of air passing up through the chamber C from the air-chamber B′ to the outlet $c'$ will be compelled to pass in a zigzag manner from side to side of the chamber, both under and over the respective trays, as indicated by the arrows thereat.

The operation of the draining and drying apparatus is as follows: The indigo magma or paste is taken directly from the oxidizing-tank (division A) and spread evenly over the draining-cloths in the trays, and the latter then slipped through the respective openings 4 into the drying-chamber C, and the doors 5 5 thereof closed. The drain-water passes, by gravitation, through the cloths $d'$ into the trays D; thence into the troughs E, by which it is finally discharged as waste through the pipes $e'$ $e''$, and the warm air from the chamber B passes in a strong, continuous, zigzag current upward or under and over the trays successively, and carries off all the moisture through the escape-flue $c'$. The smoke and gases produced in the furnace B escape through the chimney $b'''$. The thus thoroughly-dried indigo is then removed from the trays, and finally condensed into solid blocks, as described in the specification of division C.

The above-described process and apparatus will so rapidly and thoroughly dry the indigo as to prevent the possibility of the production or formation therein of any mold or fungus whatever.

I claim as my invention—

1. The process of draining and drying the freshly-oxidized indigo magma or paste by subjecting the same, in thin strata, on draining-cloths supported in a series of trays in a containing-chamber, to the action of a strong continuous current of either warm or cold air, substantially as and for the purpose hereinbefore described.

2. The apparatus, consisting of the changeable draining and drying trays D, arranged in a containing-chamber, C, substantially in the manner set forth, in combination with suitable drain-troughs, waste-pipes, and a strong current of air passing through the said chamber, substantially as and for the purpose hereinbefore described.

THEODORE T. WOODRUFF.

Witnesses:
 BENJ. MORISON,
 WM. H. MORISON.